United States Patent
Hahn et al.

(10) Patent No.: US 10,455,459 B2
(45) Date of Patent: Oct. 22, 2019

(54) METHOD AND APPARATUS FOR ESTABLISHING SESSION FOR DATA TRANSMISSION AND RECEPTION IN WIRELESS COMMUNICATION SYSTEM

(71) Applicant: LG ELECTRONICS INC., Seoul (KR)

(72) Inventors: Genebeck Hahn, Seoul (KR); Jiwon Kang, Seoul (KR); Heejin Kim, Seoul (KR); Ilmu Byun, Seoul (KR); Heejeong Cho, Seoul (KR); Hyunjin Shim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 15/684,860

(22) Filed: Aug. 23, 2017

(65) Prior Publication Data

US 2018/0063752 A1 Mar. 1, 2018

Related U.S. Application Data

(60) Provisional application No. 62/378,230, filed on Aug. 23, 2016.

(51) Int. Cl.
| | |
|---|---|
| *H04W 36/00* | (2009.01) |
| *H04W 36/30* | (2009.01) |
| *H04W 36/38* | (2009.01) |
| *H04W 76/12* | (2018.01) |
| *H04W 76/15* | (2018.01) |
| *H04W 76/16* | (2018.01) |
| *H04W 12/06* | (2009.01) |

(52) U.S. Cl.
CPC ........ *H04W 36/0011* (2013.01); *H04W 36/30* (2013.01); *H04W 36/38* (2013.01); *H04W 76/12* (2018.02); *H04W 76/15* (2018.02); *H04W 76/16* (2018.02); *H04W 12/06* (2013.01); *H04W 36/0038* (2013.01)

(58) Field of Classification Search
None
See application file for complete search history.

(56) References Cited

U.S. PATENT DOCUMENTS

| | | | |
|---|---|---|---|
| 2008/0104210 A1* | 5/2008 | Ramankutty | H04W 12/08 709/221 |
| 2015/0029956 A1* | 1/2015 | Moses | H04W 4/70 370/329 |
| 2015/0163709 A1* | 6/2015 | Lee | H04L 65/1069 370/332 |
| 2015/0263957 A1* | 9/2015 | Wang | H04W 4/90 370/230 |

(Continued)

*Primary Examiner* — Gregory B Sefcheck
*Assistant Examiner* — Suk Jin Kang
(74) *Attorney, Agent, or Firm* — Lee Hong Degerman Kang Waimey

(57) ABSTRACT

Disclosed are a method and apparatus for establishing a session for a radio access network (RAN) node to transmit and receive data in a wireless communication system. According to the present disclosure, a first session setup request message requesting session setup is received from a terminal, the first session setup request message is transmitted to a first network node for session setup, a session setup complete message is received from the first network node, and the session setup complete message is transmitted to the terminal.

14 Claims, 10 Drawing Sheets

(56) References Cited

U.S. PATENT DOCUMENTS

| | | | |
|---|---|---|---|
| 2017/0078874 A1* | 3/2017 | Lee | H04W 12/04 |
| 2017/0134998 A1* | 5/2017 | Xu | H04W 36/08 |
| 2017/0303169 A1* | 10/2017 | Hampel | H04W 76/12 |
| 2017/0311208 A1* | 10/2017 | Yu | H04W 36/0016 |
| 2017/0311371 A1* | 10/2017 | Olsson | H04W 76/27 |
| 2018/0041931 A1* | 2/2018 | Shimojou | H04W 36/0055 |
| 2018/0063707 A1* | 3/2018 | Lee | H04W 12/04 |
| 2018/0098251 A1* | 4/2018 | Li | H04W 36/0016 |
| 2018/0184350 A1* | 6/2018 | Hassan | H04H 60/45 |
| 2018/0199240 A1* | 7/2018 | Dao | H04W 36/14 |
| 2018/0220479 A1* | 8/2018 | Shu | H04W 88/16 |
| 2018/0249388 A1* | 8/2018 | Baek | H04W 36/00 |
| 2018/0288670 A1* | 10/2018 | Li | H04W 8/186 |

* cited by examiner

[Fig.1]
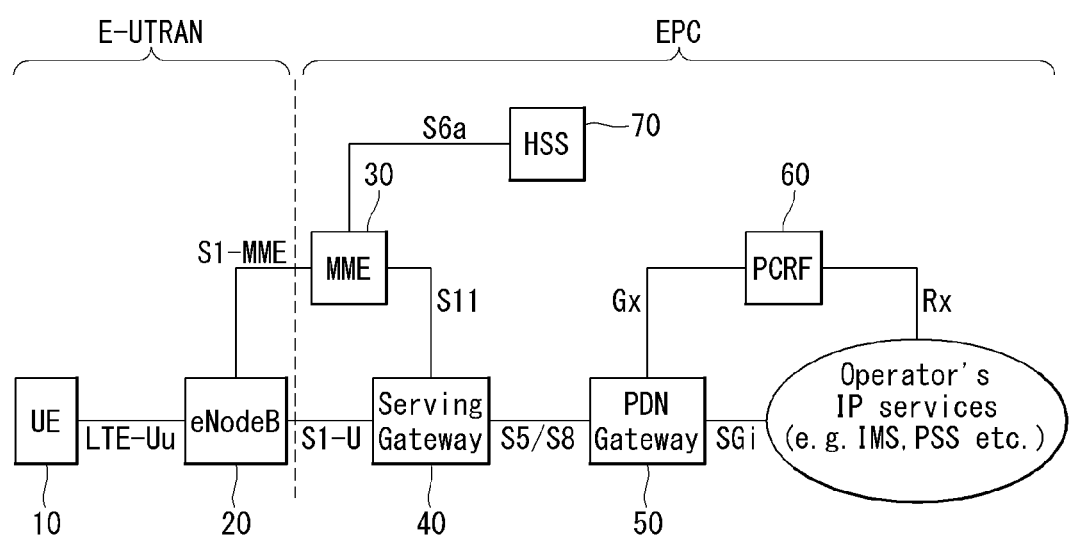

[Fig.2]
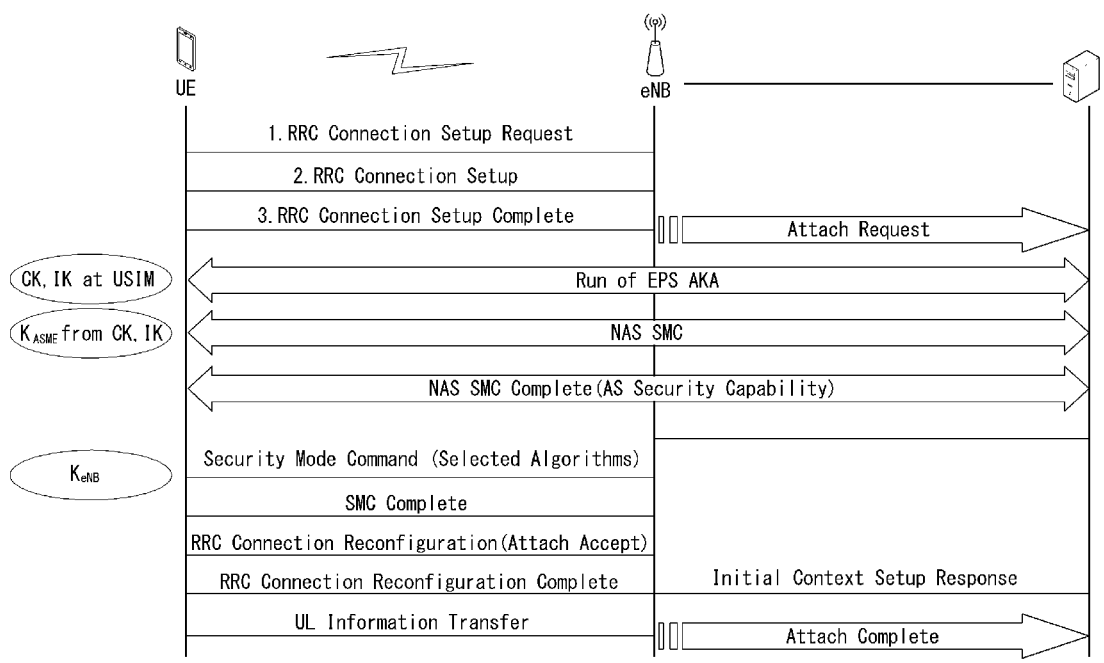

[Fig.3]
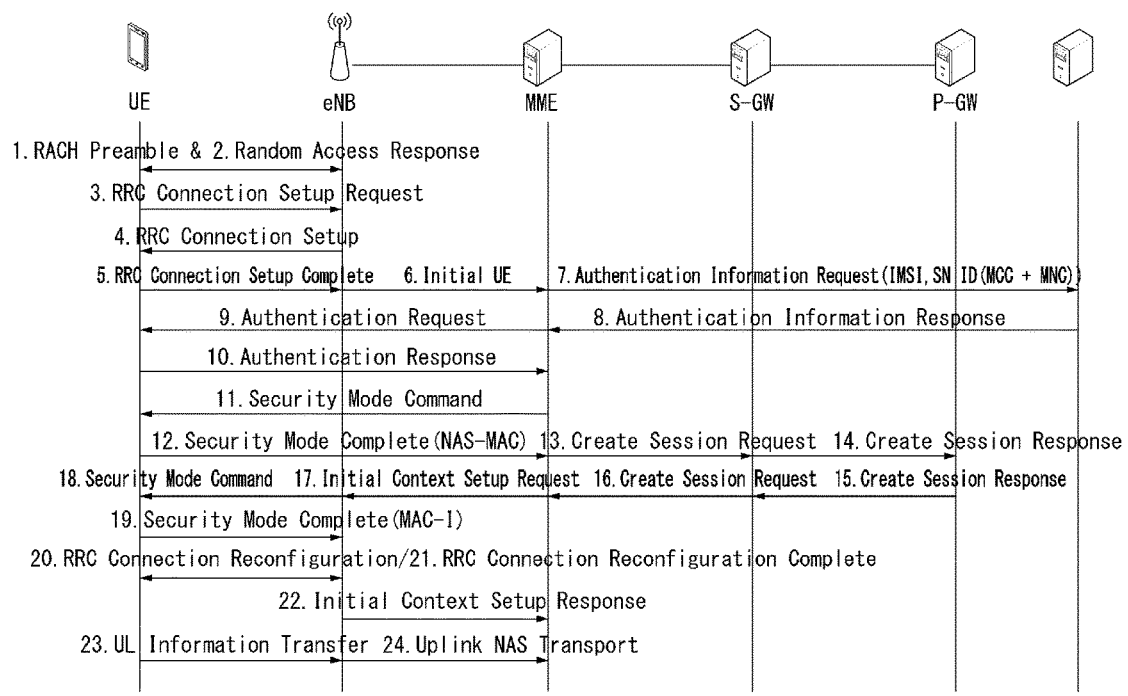

[Fig.4]
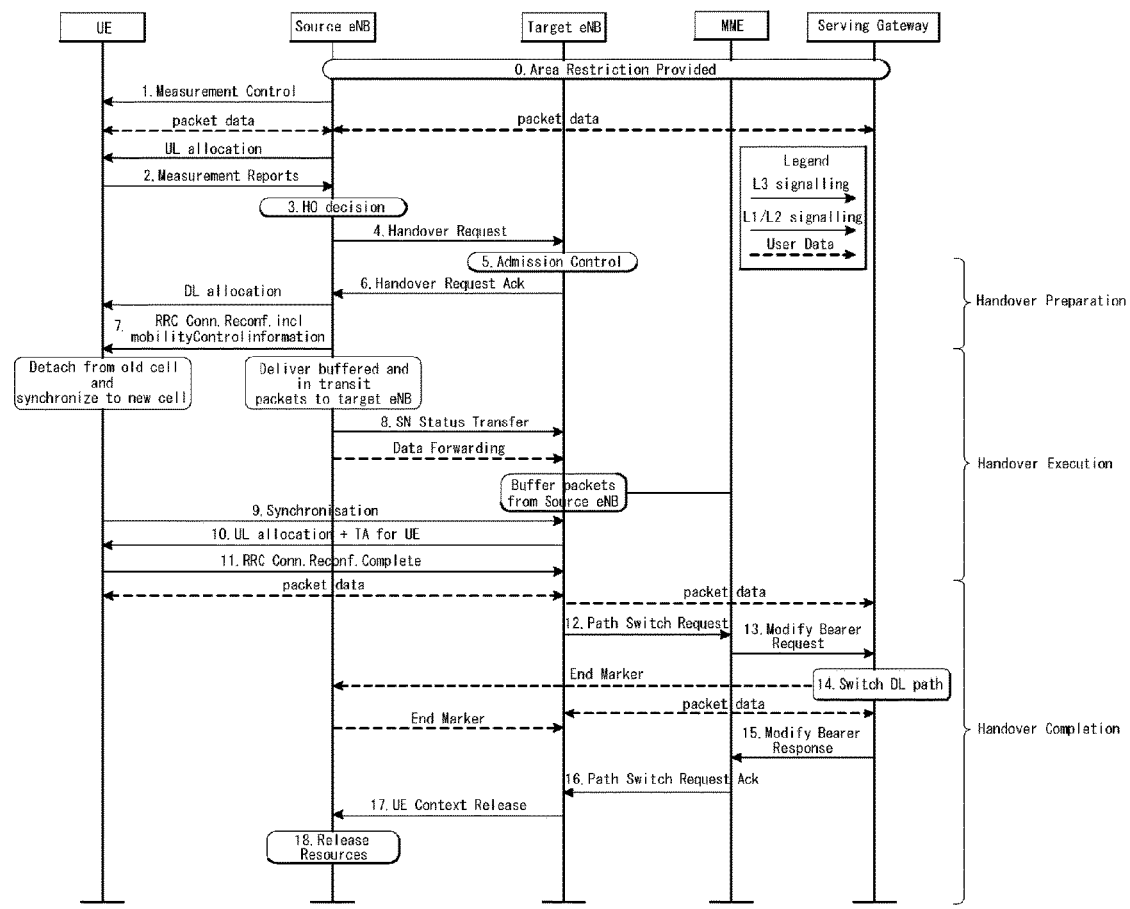

[Fig.5]
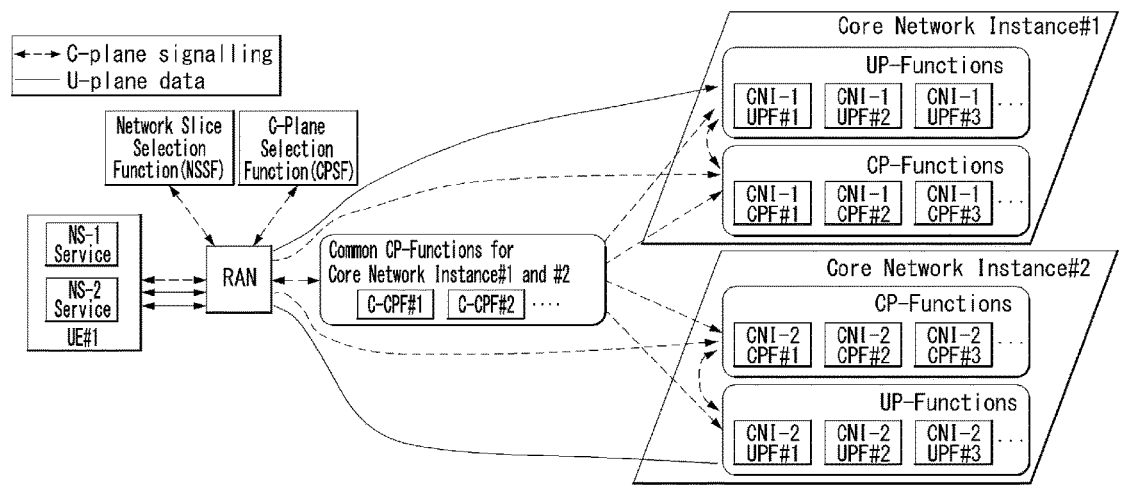

[Fig.6]
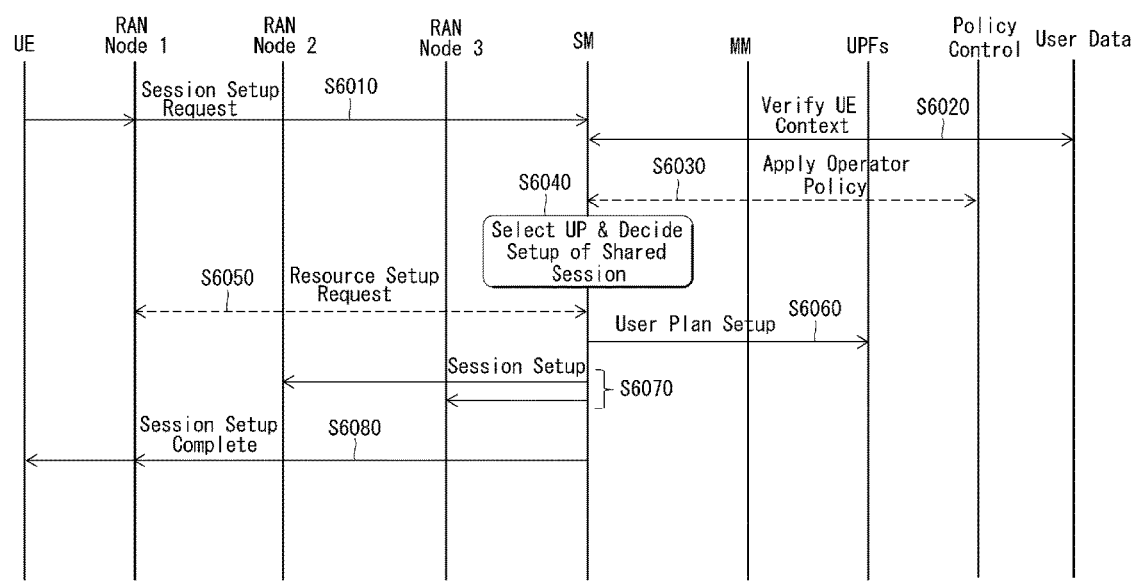

[Fig.7]
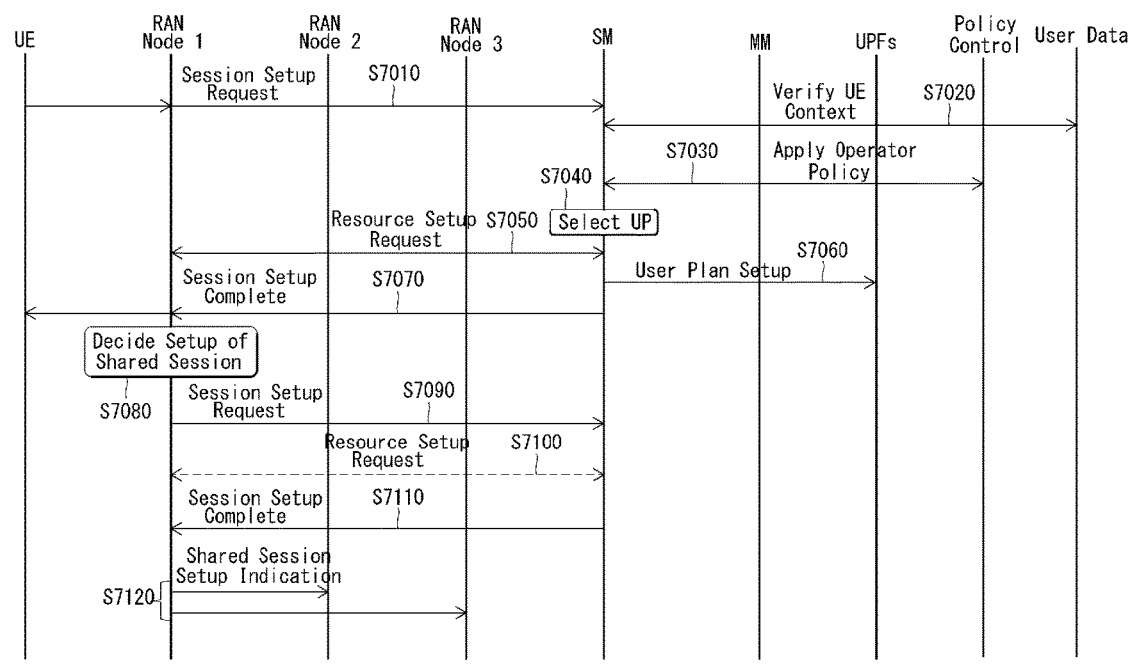

[Fig.8]
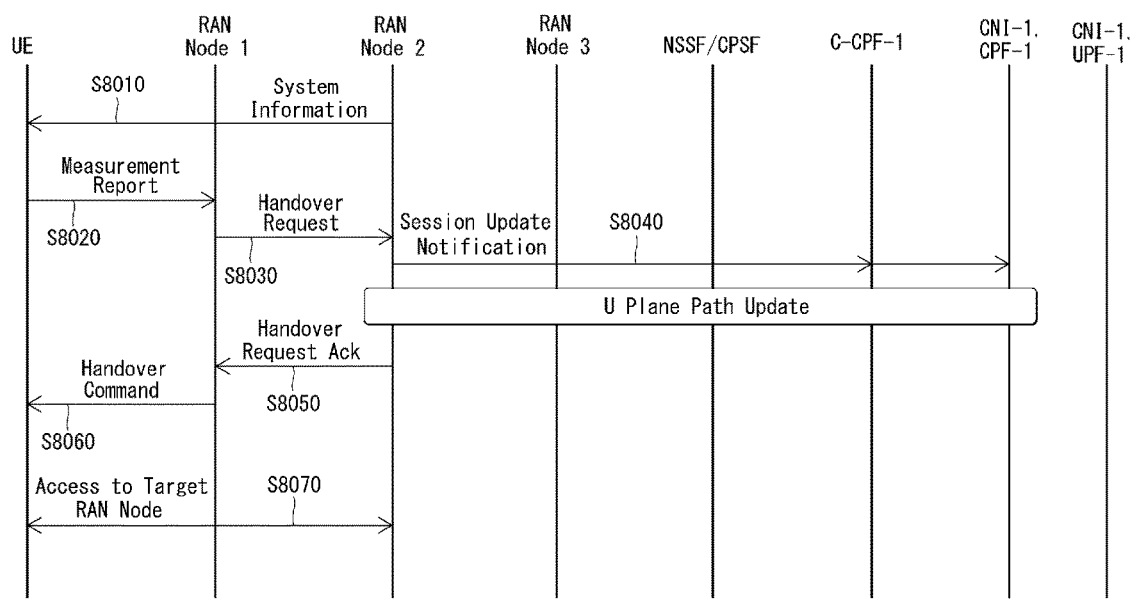

[Fig.9]
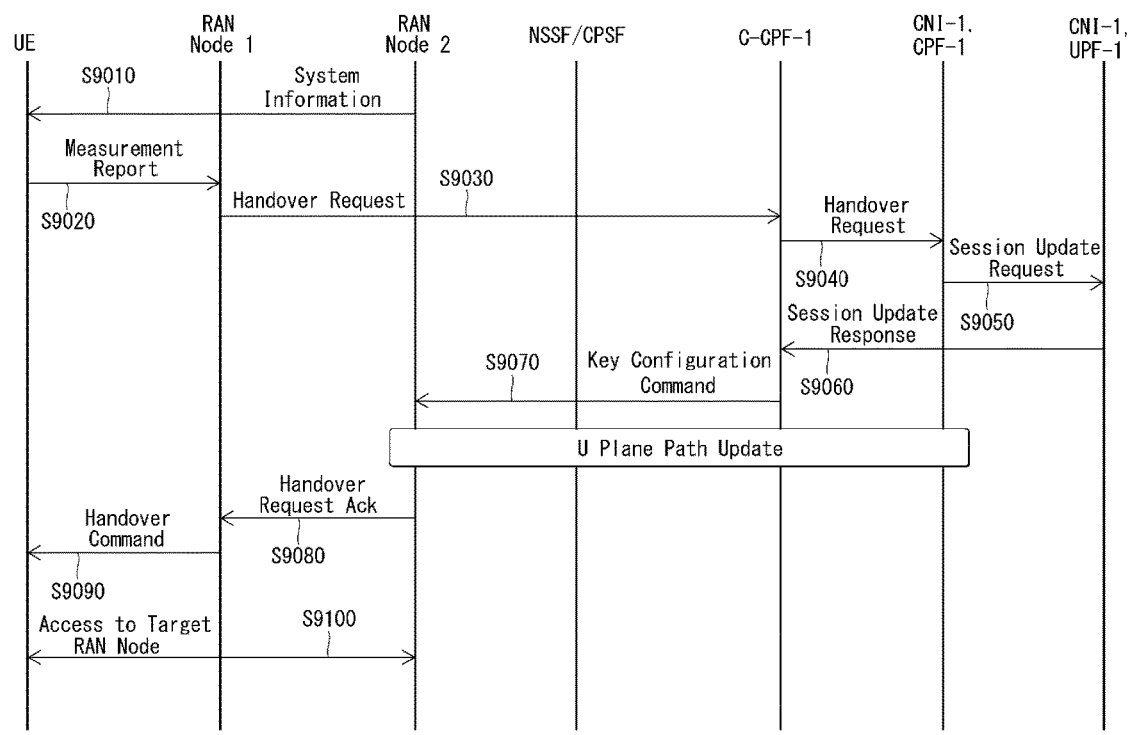

[Fig.10]
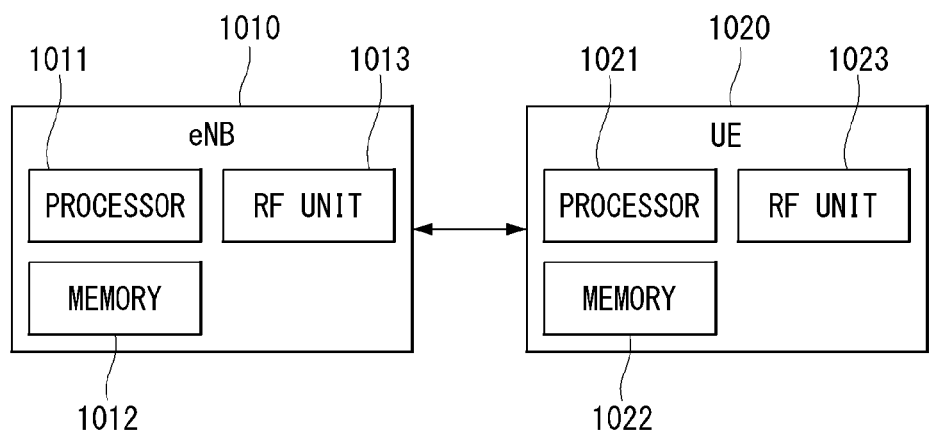

METHOD AND APPARATUS FOR ESTABLISHING SESSION FOR DATA TRANSMISSION AND RECEPTION IN WIRELESS COMMUNICATION SYSTEM

CROSS-REFERENCE TO RELATED APPLICATION

Pursuant to 35 U.S.C. § 119(e), this application claims the benefit of U.S. Provisional Patent Application No. 62/378,230, filed on Aug. 23, 2016, the contents of which are hereby incorporated by reference herein in its entirety.

BACKGROUND OF THE INVENTION

Field

The present disclosure relates to a wireless communication system and, more particularly, to a method and apparatus for transmitting and receiving data by establishing a session in a wireless communication system.

Description of Related Art

Mobile communication systems have been developed to provide voice services while assuring users' activities. However, the mobile communication systems have been expanding their areas up to data services as well as voice services, and a current explosive growth of traffic caused a lack of resources, so that users require further advanced mobile communication systems offering quicker services.

As requirements for next-generation mobile communication systems, covering drastically increasing data traffic, a significant increase in transmission rate per user, much more linked devices, very low end-to-end latency, and high energy efficiency should be supported. To this end, various techniques are under research, such as small cell enhancement, dual connectivity, massive MIMO (Multiple Input Multiple Output), in-band full duplex, NOMA (non-orthogonal multiple access), super wideband support, or device networking.

Also, compared with security features evolved up to the specifications in the 4G mobile communication system, the security features expected to be added to the 5G mobile communication system may be described as follows:

The 5G mobile communication system has to accommodate a new type of service delivery model such as network slicing. Network slicing refers to providing a virtual isolated sub-network optimized for service characteristics and aims to provide optimized services for individual applications since requirements differ from application to application.

Accordingly, security architecture also needs to be very flexible according to service characteristics of each network slice, which indicates that the 5G mobile communication network has to be designed to reduce security-related overhead to accommodate network slicing.

The 5G mobile communication system has to be designed not only to provide new functions but also to accommodate new verticals (industries).

This aims to accommodate a new business model about how the mobile communication network and communication should be provided.

In other words, it indicates that a new trust model which takes into account various types of devices (for example, unattended machines, sensors, wearable devices, and vehicles) with security requirements different from each other and some important sectors (for example, public safety and eHealth) has to be defined.

The 5G mobile communication system has to provide optimized Multi-RAT operation. This feature is aimed to reduce OTA signaling and delay required to perform authentication or security setup for Multi-RAT access having a different security mechanism from each other.

In other words, in the existing 4G and previous standards, when connecting to a different RAT, separate authentication and security setting have been performed on a user equipment due to different authentication methods and security setup mechanisms such as key handling even if the user equipment accesses the same core network.

However, the 5G security specification requires that effective Multi-RAT security architecture capable of reducing such redundancy should be provided.

Meanwhile, one of the issues being discussed recently related to the 5G network architecture is to adopt a network slicing concept for the 5G new core network.

In addition, one of the architectural principles of the 5G core network states that a user equipment attaches to a network without setting a session for data transmission, network slices are isolated/separated from each other, and a core network instance (for example, a network slice) is dedicated to terminals of the same type.

The aforementioned statement originates from the fact that the 5G core network is expected to evolve to implement service-oriented architecture, and a fixed, single type of network architecture will not be able to satisfy various service requirements.

In other words, it is not cost-effective to accommodate all the services expected to be provided by the 5G network in a single, fixed network architecture. Therefore, a consensus is formed that network architecture based on a physically fixed structure is divided logically into network slices to accommodate various service requirements.

SUMMARY OF THE INVENTION

An aspect of the present disclosure provides a method and apparatus for establishing a session to transmit and receive data for a service requiring low latency in a next-generation system (e.g., 5G system).

Also, another aspect of the present disclosure provides a method and apparatus for establishing a session to provide a service requiring low latency in units of user equipments (UEs).

Also, another aspect of the present disclosure provides a method and apparatus for transmitting and receiving, by multiple UEs, data related to a service requiring low latency in the same session.

Also, another aspect of the present disclosure provides a method and apparatus for transmitting and receiving, by each UE, data related to a service requiring low latency through a single session without separately establishing a session by the UEs.

Also, another aspect of the present disclosure provides a method and apparatus for performing handover through a session established in units of base stations (BSs), without separately establishing a session.

Also, another aspect of the present disclosure provides a method and apparatus for not creating a security key at the time of handover by creating a security key of a session established in units of BSs in advance.

The technical problems of the present disclosure are not limited to the above-described technical problems and the other technical problems will be understood by those skilled in the art from the following description.

According to an aspect of the present disclosure, a method and apparatus for establishing a session to transmit and receive data in a wireless communication system are provided.

A session establishing method according to an embodiment of the present disclosure includes: receiving a first session setup request message requesting session setup from a terminal, the first session setup request message including at least one of a service type indicator indicating a type of a specific service requesting session setup and first information related to adjacent RAN nodes supporting the specific service; transmitting the first session setup request message to a first network node for session setup; receiving a session setup complete message from the first network node; and transmitting the session setup complete message to the terminal, wherein the session setup complete message includes a setup indicator indicating setup of a specific session and second information related to at least one RAN node to which the specific session is established, among the adjacent RAN nodes, and the specific session is established in units of RAN nodes and is a wireless path on which multiple terminals transmit and receive data related to the specific service to and from the same RAN node.

A session establishing method according to another embodiment of the present disclosure includes: transmitting a first session setup request message requesting session setup to a radio access network (RAN) node, the first session setup request message including at least one of a service type indicator indicating a type of a specific service requesting session setup and first information related to adjacent RAN nodes supporting the specific service; and receiving a session setup complete message from the RAN node, wherein the session setup complete message includes a setup indicator indicating setup of a specific session and second information related to at least one RAN node to which the specific session is established, among the adjacent RAN nodes, and the specific session is established in units of RAN nodes and is a wireless path on which multiple terminals transmit and receive data related to the specific service to and from the same RAN node.

A radio access network (RAN) node according to another embodiment of the present disclosure includes: a communication unit transmitting and receiving a radio signal to and from an external source; and a processor functionally coupled to the communication unit, wherein the processor receives a first session setup request message requesting session setup from a terminal, the first session setup request message including at least one of a service type indicator indicating a type of a specific service requesting session setup and first information related to adjacent RAN nodes supporting the specific service, transmits the first session setup request message to a first network node for session setup, receives a session setup complete message from the first network node; and transmits the session setup complete message to the terminal, wherein the session setup complete message includes a setup indicator indicating setup of a specific session and second information related to at least one RAN node to which the specific session is established, among the adjacent RAN nodes, and the specific session is established in units of RAN nodes and is a wireless path on which multiple terminals transmit and receive data related to the specific service to and from the same RAN node.

BRIEF DESCRIPTION OF DRAWINGS

The accompanying drawings, which are included to provide a further understanding of the invention and are incorporated in and constitute a part of this specification, illustrate embodiments of the invention and together with the description serve to explain the principles of the invention. In the drawings:

FIG. 1 illustrates one example of an EPS (Evolved Packet System) related to the LTE system to which technical features of the present disclosure may be applied.

FIG. 2 illustrates one example of an initial key activation procedure in the E-UTRAN.

FIG. 3 is a flow diagram illustrating an authentication and key setting procedure at the time of an initial connection to the E-UTRAN.

FIG. 4 is a flow chart illustrating an intra-MME/serving gateway handover procedure.

FIG. 5 illustrates sharing a set of common C-plane functions among a plurality of core network instances to which a method according to the present disclosure may be applied.

FIG. 6 is a flow chart illustrating an example of a method for establishing a session proposed in this disclosure.

FIG. 7 is a flow chart illustrating another example of a method for establishing a session proposed in this disclosure.

FIG. 8 is a flow chart illustrating an example of a method for performing handover proposed in this disclosure.

FIG. 9 is a flow chart illustrating another example of a method for performing handover proposed in this disclosure.

FIG. 10 is a block diagram of a wireless communication device to which the methods proposed in this disclosure may be applied.

DETAILED DESCRIPTION OF THE INVENTION

Reference will now be made in detail to the preferred embodiments of the present disclosure, examples of which are illustrated in the accompanying drawings. The detailed description set forth below in connection with the appended drawings is a description of exemplary embodiments and is not intended to represent the only embodiments through which the concepts explained in these embodiments can be practiced. The detailed description includes details for the purpose of providing an understanding of the present disclosure. However, it will be apparent to those skilled in the art that these teachings may be implemented and practiced without these specific details.

In some instances, known structures and devices are omitted, or are shown in block diagram form focusing on important features of the structures and devices, so as not to obscure the concept of the present disclosure.

In the embodiments of the present disclosure, the enhanced Node B (eNode B or eNB) may be a terminal node of a network, which directly communicates with the terminal. In some cases, a specific operation described as performed by the eNB may be performed by an upper node of the eNB. Namely, it is apparent that, in a network comprised of a plurality of network nodes including an eNB, various operations performed for communication with a terminal may be performed by the eNB, or network nodes other than the eNB. The term 'eNB' may be replaced with the term 'fixed station', 'base station (BS)', 'Node B', 'base transceiver system (BTS),', 'access point (AP)', 'MeNB (Macro eNB or Master eNB)', 'SeNB (Secondary eNB)' etc. The term 'user equipment (UE)' may be replaced with the term 'terminal', 'mobile station (MS)', 'user terminal (UT)', 'mobile subscriber station (MSS)', 'subscriber station (SS)', 'Advanced Mobile Station (AMS)', 'Wireless terminal (WT)', 'Machine-Type Communication (MTC) device', 'Machine-to-Machine (M2M) device', 'Device-to-Device (D2D) device', wireless device, etc.

In the embodiments of the present disclosure, "downlink (DL)" refers to communication from the eNB to the UE, and "uplink (UL)" refers to communication from the UE to the eNB. In the downlink, transmitter may be a part of eNB, and receiver may be part of UE. In the uplink, transmitter may be a part of UE, and receiver may be part of eNB.

Specific terms used for the embodiments of the present disclosure are provided to aid in understanding of the present disclosure. These specific terms may be replaced with other terms within the scope and spirit of the present disclosure.

The embodiments of the present disclosure can be supported by standard documents disclosed for at least one of wireless access systems, Institute of Electrical and Electronics Engineers (IEEE) 802, 3rd Generation Partnership Project (3GPP), 3GPP Long Term Evolution (3GPP LTE), LTE-Advanced (LTE-A), and 3GPP2. Steps or parts that are not described to clarify the technical features of the present disclosure can be supported by those documents. Further, all terms as set forth herein can be explained by the standard documents.

Techniques described herein can be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), 'non-orthogonal multiple access (NOMA)', etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. UTRA is a part of Universal Mobile Telecommunication System (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE.

Embodiments of the present disclosure may be supported by standard documents disclosed for at least one of the IEEE 802, 3GPP, and 3GPP2 wireless access systems. In other words, among the embodiments of the present disclosure, those steps or parts not described for the purpose of clarifying the technical principles of the present disclosure may be supported by the documents. Also, all of the terms disclosed in the present disclosure may be described by the standard documents.

To clarify the description of the present disclosure, the 5G system is mainly dealt with. However, the technical features of the present disclosure is not limited to the specific system, but may be equally applied to the 3GPP LTE/LTE-A system.

In what follows, before describing the present disclosure with reference to appended drawings, terms used in the present document are defined briefly for the understanding of the present disclosure.

APN (Access Point Name): a name of an access point managed by a network, which is provided to a UE. In other words, it indicates the name (character string) of a PDN. On the basis of the name of the access point, the corresponding PDN for transmitting and receiving data is determined.

MME: short for Mobility Management Entity, which is responsible for controlling each entity within an EPS to provide a session and mobility for a UE.

Session: a passage for data transmission. PDN, Bearer, IP flow unit, and so on may be used as a session unit.

As defined in the 3GPP specification, each unit may be distinguished by its application range: a unit for describing the whole network (APN or PDN scale), a unit for describing QoS within the network (Bearer scale), and a destination IP address unit.

TIN: Temporary Identify used in Next update
P-TMSI: Packet Temporary Mobile Subscriber
TAU: Tracking Area Update
GBR: Guaranteed Bit Rate
GTP: GPRS Tunneling Protocol
TEID: Tunnel Endpoint ID
GUTI: Globally Unique Temporary Identity, a UE identifier known to the MME.

FIG. 1 is a view illustrating an Evolved Packet System which is associated with the Long Term Evolution (LTE) system to which the present disclosure may be applied. The LTE system aims to provide seamless Internet Protocol (IP) connectivity between a user equipment (UE, 10) and a pack data network (PDN), without any disruption to the end user's application during mobility. While the LTE system encompasses the evolution of the radio access through an E-UTRAN (Evolved Universal Terrestrial Radio Access Network) which defines a radio protocol architecture between a user equipment and a base station (20), it is accompanied by an evolution of the non-radio aspects under the term 'System Architecture Evolution' (SAE) which includes an Evolved Packet Core (EPC) network. The LTE and SAE comprise the Evolved Packet System (EPS).

The EPS uses the concept of EPS bearers to route IP traffic from a gateway in the PDN to the UE. A bearer is an IP packet flow with a specific Quality of Service (QoS) between the gateway and the UE. The E-UTRAN and EPC together set up and release the bearers as required by applications.

The EPC, which is also referred to as the core network (CN), controls the UE and manages establishment of the bearers. As depicted in FIG. 1, the node (logical or physical) of the EPC in the SAE includes a Mobility Management Entity (MME) 30, a PDN gateway (PDN-GW or P-GW) 50, a Serving Gateway (S-GW) 40, a Policy and Charging Rules Function (PCRF) 40, a Home subscriber Server (HSS) 70, etc.

The MME 30 is the control node which processes the signaling between the UE and the CN. The protocols running between the UE and the CN are known as the Non-Access Stratum (NAS) protocols. Examples of functions supported by the MME 30 includes functions related to bearer management, which includes the establishment, maintenance and release of the bearers and is handled by the session management layer in the NAS protocol, and functions related to connection management, which includes the establishment of the connection and security between the network and UE, and is handled by the connection or mobility management layer in the NAS protocol layer.

The S-GW 40 serves as the local mobility anchor for the data bearers when the UE moves between eNodeBs. All user IP packets are transferred through the S-GW 40. The S-GW 40 also retains information about the bearers when the UE is in idle state (known as ECM-IDLE) and temporarily buffers downlink data while the MME initiates paging of the UE to re-establish the bearers. Further, it also serves as the mobility anchor for inter-working with other 3GPP technologies such as GPRS (General Packet Radio Service) and UMTS (Universal Mobile Telecommunications System).

The P-GW 50 serves to perform IP address allocation for the UE, as well as QoS enforcement and flow-based charging according to rules from the PCRF 60. The P-GW 50 performs QoS enforcement for Guaranteed Bit Rate (GBR) bearers. It also serves as the mobility anchor for inter-working with non-3GPP technologies such as CDMA2000 and WiMAX networks.

The PCRF 60 serves to perform policy control decision-making, as well as for controlling the flow-based charging functionalities.

The HSS 70, which is also referred to as a Home Location Register (HLR), contains users' SAE subscription data such as the EPS-subscribed QoS profile and any access restrictions for roaming. Further, it also holds information about the PDNs to which the user can connect. This can be in the form of an Access Point Name (APN), which is a label according to DNS (Domain Name system) naming conventions describing the access point to the PDN, or a PDN Address which indicates subscribed IP addresses.

Between the EPS network elements shown in FIG. 1, various interfaces such as an S1-U, S1-MME, S5/S8, S11, S6a, Gx, Rx and SGi are defined.

FIG. 6 illustrates one example of an initial key activation procedure in the E-UTRAN.

FIG. 7 is a flow diagram illustrating an authentication and key setting procedure at the time of an initial connection to the E-UTRAN.

In other words, FIG. 6 illustrates an overall procedure through which authentication and key setting for a UE is performed when the user performs an initial connection in the 4G system (LTE(-A) system).

With reference to FIG. 6, after performing a random access, the UE establishes an RRC connection to an eNB through a first to third procedures (RRC Connection Setup Request, RRC Connection Setup, and RRC Connection Setup Complete).

Afterwards, through the Attach procedure to the MME, the UE performs authentication and key setting for data/control signaling protection of the AS/NAS layer.

FIG. 7 elaborates the authentication procedure performed in the network access procedure of FIG. 6.

FIG. 7 shows only the parts necessary for the UE to perform the initial access, but excludes those parts which may be performed selectively depending on situations.

FIG. 4 is a flow chart illustrating an intra-MME/serving gateway handover procedure.

Specifically, 0. The UE context within the source eNB contains information regarding roaming and access restrictions which were provided either at connection establishment or at the last TA update.

1. The source eNB configures the UE measurement procedures according to the roaming and access restriction information and e.g. the available multiple frequency band information. Measurements provided by the source eNB may assist the function controlling the UE's connection mobility.

2. A MEASUREMENT REPORT is triggered and sent to the eNB.

3. The source eNB makes decision based on MEASUREMENT REPORT and RRM information to hand off the UE.

4. The source eNB issues a HANDOVER REQUEST message to the target eNB passing necessary information to prepare the HANDOVER at the target side (UE X2 signalling context reference at source eNB, UE S1 EPC signalling context reference, target cell ID, KeNB*, RRC context including the C-RNTI of the UE in the source eNB, AS-configuration, E-RAB context and physical layer ID of the source cell+short MAC-I for possible RLF recovery). UE X2/UE S1 signalling references enable the target eNB to address the source eNB and the EPC. The E-RAB context includes necessary RNL and TNL addressing information, and QoS profiles of the E-RABs.

5. Admission Control may be performed by the target eNB dependent on the received E-RAB QoS information to increase the likelihood of a successful HANDOVER, if the resources can be granted by target eNB. The target eNB configures the required resources according to the received E-RAB QoS information and reserves a C-RNTI and optionally a RACH preamble. The AS-configuration to be used in the target cell can either be specified independently (i.e. an "establishment") or as a delta compared to the AS-configuration used in the source cell (i.e. a "reconfiguration").

6. The target eNB prepares HANDOVER with L1/L2 and sends the HANDOVER REQUEST ACKNOWLEDGE to the source eNB. The HANDOVER REQUEST ACKNOWLEDGE message includes a transparent container to be sent to the UE as an RRC message to perform the handover. The container includes a new C-RNTI, target eNB security algorithm identifiers for the selected security algorithms, may include a dedicated RACH preamble, and possibly some other parameters i.e. access parameters, SIBs, etc. The HANDOVER REQUEST ACKNOWLEDGE message may also include RNL/TNL information for the forwarding tunnels, if necessary.

NOTE: As soon as the source eNB receives the HANDOVER REQUEST ACKNOWLEDGE, or as soon as the transmission of the handover command is initiated in the downlink, data forwarding may be initiated.

Steps 7 to 16 provide means to avoid data loss during HANDOVER.

7. The target eNB generates the RRC message to perform the handover, i.e. RRCConnectionReconfiguration message including the mobilityControlInformation, to be sent by the source eNB towards the UE. The source eNB performs the necessary integrity protection and ciphering of the message. The UE receives the RRCConnectionReconfiguration message with necessary parameters (i.e. new C-RNTI, target eNB security algorithm identifiers, and optionally dedicated RACH preamble, target eNB SIBs, etc.) and is commanded by the source eNB to perform the HANDOVER. The UE does not need to delay the handover execution for delivering the HARQ/ARQ responses to source eNB.

8. The source eNB sends the SN STATUS TRANSFER message to the target eNB to convey the uplink PDCP SN receiver status and the downlink PDCP SN transmitter status of E-RABs for which PDCP status preservation applies (i.e. for RLC AM). The uplink PDCP SN receiver status includes at least the PDCP SN of the first missing UL SDU and may include a bit map of the receive status of the out of sequence UL SDUs that the UE needs to retransmit in the target cell, if there are any such SDUs. The downlink PDCP SN transmitter status indicates the next PDCP SN that the target eNB shall assign to new SDUs, not having a PDCP SN yet. The source eNB may omit sending this message if none of the E-RABs of the UE shall be treated with PDCP status preservation.

9. After receiving the RRCConnectionReconfiguration message including the mobilityControlInformation, UE performs synchronisation to target eNB and accesses the target cell via RACH, following a contention-free procedure if a dedicated RACH preamble was indicated in the mobilityControlInformation, or following a contention-based procedure if no dedicated preamble was indicated. UE derives target eNB specific keys and configures the selected security algorithms to be used in the target cell.

10. The target eNB responds with UL allocation and timing advance.

11. When the UE has successfully accessed the target cell, the UE sends the RRCConnectionReconfigurationComplete message (C-RNTI) to confirm the handover, along with an uplink Buffer Status Report, whenever possible, to the target eNB to indicate that the handover procedure is completed for the UE. The target eNB verifies the C-RNTI sent in the RRCConnectionReconfigurationComplete message. The target eNB can now begin sending data to the UE.

12. The target eNB sends a PATH SWITCH REQUEST message to MME to inform that the UE has changed cell.

13. The MME sends a MODIFY BEARER REQUEST message to the Serving Gateway.

14. The Serving Gateway switches the downlink data path to the target side. The Serving gateway sends one or more "end marker" packets on the old path to the source eNB and then can release any U-plane/TNL resources towards the source eNB.

15. The Serving Gateway sends a MODIFY BEARER RESPONSE message to MME.

16. The MME confirms the PATH SWITCH REQUEST message with the PATH SWITCH REQUEST ACKNOWLEDGE message.

17. By sending the UE CONTEXT RELEASE message, the target eNB informs success of HANDOVER to source eNB and triggers the release of resources by the source eNB. The target eNB sends this message after the PATH SWITCH REQUEST ACKNOWLEDGE message is received from the MME.

18. Upon reception of the UE CONTEXT RELEASE message, the source eNB can release radio and C-plane related resources associated to the UE context. Any ongoing data forwarding may continue.

FIG. 5 is a view illustrating sharing a set of common C-plane functions among a plurality of core network instances to which a method according to the present disclosure may be applied.

A 5G network architecture is anticipated to be configured to adopt a concept of network slicing in a core network.

FIG. 5 illustrates an example of such an architecture, and a UE is connected to core network interfaces (CNIs) for an actual service through common CPFs.

In the related art 4G system, the UE is required to perform a session establishment/handover procedure equally applied to every service, regardless of type of service.

However, since specific ultra-reliable and low-latency (URLLC) services have strict latency requirements, if a procedure of establishing a new/additional session for data transmission and reception, changing a data transmission path during handover, and the like, is performed, latency requirements requested by URLLC services may not be satisfied.

Also, since connections to network slices are made through establishing different sessions in the 5G system, the 5G core network is required to reduce a negative impact regarding user experience by reducing packet loss based on switching a path of data transmission that occurs when a UE perform handover to support session continuity of each UE.

That is, in the conventional 4G network, a handover procedure in the form of break-before-make was defined, but this is a mechanism not considering QoS requirements, or the like, of each service, and since a UE changes a data transmission path from a source eNB to a target eNB after completing handover, delay inevitably occurs in terms of data reception of the UE.

Thus, in order to solve such a problem, the present disclosure provides a method for establishing a session in units of eNBs, rather than in units of UEs, for providing a service requiring low latency, while a UE is performing a network access procedure toward the 5G core network or is establishing a session for a specific service.

That is, the present disclosure proposes a method for establishing a session allowing multiple UEs to use for a service requiring low latency in a network access procedure or a procedure for establishing a session for a specific service of each UE.

Also, the present disclosure proposes a method for rapidly updating a security setting (or security configuration) by utilizing a previously established shared session when a UE performs handover to another RAN node in cases where a previously stored security setting exists in a specific RAN node after accessing a network/establishing a session.

That is, the sessions for providing a service requiring low latency proposes a method for reducing delay in data transmission during handover due to a change in a location of a UE.

FIG. 6 is a flow chart illustrating an example of a method for establishing a session proposed in this disclosure.

Referring to FIG. 6, a session in units of RAN nodes (or eNBs) for a service requiring low latency may be established through a procedure of establishing a session for providing a specific service.

In detail, a UE transmits a session setup request message to a RAN Node 1 to establish a session for a service requiring low latency (S6010).

The session setup request message may include information related to a service type indicator indicating a service requiring low latency and adjacent RAN nodes supporting the service requiring low latency.

The service type indicator is required to request a session management (SM) function to establish a shared session for adjacent RAN nodes to which the UE transmits.

If the service type indicator is not included in the session setup request message, the service type indicator may also be transmitted through RRC signaling.

Information regarding adjacent RAN nodes may be list information regarding RAN nodes or an indicator indicating RAN nodes.

Also, the information related to the adjacent RAN nodes may be information of the number of adjacent RAN nodes limited depending on quality of signal (QoS) detected during a process in which the UE accesses a network or establishes a session or information of adjacent RAN nodes recognized by the RAN Node 1 as a target of network access or session setup.

If the information related to the adjacent RAN nodes is information of the number of adjacent RAN nodes limited depending on QoS detected during the process in which the UE accesses a network and establishes a session, the UE measures QoS regarding the adjacent RAN nodes before transmitting a session setup request message, and transmits a session setup request message including information regarding RAN nodes having QoS measured to be equal to or greater than a threshold value to the RAN Node 1.

Here, even after transmission of the session setup request message, the UE may measure QoS of adjacent RAN nodes periodically or according to a specific event and transmit information of RAN Nodes whose QoS is equal to or greater than the threshold value to the RAN Node 1.

Upon receiving the session setup request message from the UE, the RAN Node 1 transmits the session setup request message to the SM function managing a session.

Upon receiving the session setup request message from the RAN Node 1, the SM function checks a service in which the UE has subscribed to establish a session related to a requested service.

That is, the SM function checks a service in which the UE has subscribed, by obtaining user data from a server storing user data (S6020).

The SM function interworks with a policy control function to select (or determine) an operator policy to be applied to a session (S6030).

The SM function selects a user plane function (UPF) related to a service of the session desired to be established, and determines a RAN Node for establishing a shared session according to the selected operator policy (S6040).

That is, when information of the same RAN Node is included in a session setup request message requesting setup of a session with respect to the UPF providing a specific service requiring low latency transmitted from multiple UEs according to the selected operator policy, a predetermined number of times or greater, the SM function determines to establish a shared session for the specific service in the corresponding RAN Node.

For example, in cases where a threshold value for establishing a shared session is set to 10 in the operator policy, the SM function receives session setup request messages requesting setup of a session for receiving the same specific service requiring low latency from multiple UEs.

In cases where information of RAN Node 2 is included fifteen times and information of RAN Node 3 is included twenty times in the information of adjacent RAN nodes included in the session setup request message transmitted from multiple UEs, the SM function determines to establish a shared session for the specific service in the RAN Node 2 and the RAN Node 3.

Hereinafter, it is assumed that the RAN Node 2 and the RAN Node 3 are determined as target RAN Nodes for establishing a shared session.

Thereafter, the SM function transmits a setup request message requesting setup of resources for a session to the RAN Node 1 and receives a response message thereof (S6050).

The SM function may trigger user plane setting to the UPF for the service requiring low latency, and accordingly, the SM function may obtain information regarding QoS requirements to be applied to the session requested by the UE (S6060).

Also, in step S6060, the SM function may transmit DL tunnel information regarding RAN (e.g., addresses of RAN nodes) for shared session to be set in the RAN Node 2 and the RAN Node 3 to the UPF.

The SM function transmits a setup message for establishing a shared session to the RAN Node 2 and the RAN Node 3 as setup target RAN Nodes of the shared session (S6070). Through the setup message, the SM function may inform the RAN Node 2 and the RAN Node 3 about the establishment of the shared session and request resource for establishing the shared session.

Also, the setup message may include UL tunnel information of the UPF (e.g., an address of the UPF, etc.) with which the shared session is established and QoS information indicating QoS requirements for the shared session.

Here, resource for establishing the shared session may be information of minimum and/or maximum resource (radio resource) for establishing the shared session according to characteristics of the specific service requiring low latency, QoS requirements of the specific service, and the like.

Thereafter, when establishing the shared session is completed, the SM function transmits a session setup complete message including UL tunnel information to the RAN Node 1, and the RAN Node 1 transmits the received session setup complete message to the UE to inform the UE about completion of the session establishment (S6080).

Here, the session setup complete message may include an indicator indicating that a shared session for the specific service requiring low latency and information regarding the RAN Node 2 and the RAN Node 3, RAN nodes with which the shared session has been established.

Through the session setup complete message, the UE may recognize that the shared session for the specific service requiring low latency has been established in the RAN Node 2 and the RAN Node 3.

Also, multiple UEs may transmit and receive data for receiving the specific service requiring low latency through the shared session established in the RAN Node 2 and the RAN Node 3.

For example, multiple UEs may transmit or receive data for the specific service through the same shared session established in the RAN Node 2 and the RAN Node 3.

In this manner, multiple UEs may transmit and receive data for the specific service through the single session, without having to establish a separate session according to UEs for the same service.

FIG. 7 is a flow chart illustrating another example of a method for establishing a session proposed in this disclosure.

Referring to FIG. 7, a session (hereinafter, referred to as a "shared session") in units of RAN nodes (or eNBs) for a service requiring low latency may be established on the basis of sessions established to provide a specific service.

In detail, the UE may transmit a session setup request message to the RAN Node 1 to establish a session for a service requiring low latency, and the RAN Node 1 transmits the received session setup request message to the SM function (S7010).

The session setup request message may include a service type indicator indicating the service requiring low latency.

The service type indicator is required to request the SM function to establish a shared session for adjacent RAN nodes to which the UE transmits.

If the service type indicator is not included in the session setup request message, the service type indicator may also be transmitted through RRC signaling.

Upon receiving the session setup request message from the RAN Node 1, the SM function checks a service to which the UE has subscribed to establish a session related to the requested service.

That is, the SM function checks a service to which the UE has subscribed, by obtaining user data from a server storing the user data (S7020).

The SM function interworks with the policy control function to select (or determine) an operator policy to be applied to a session (S7030).

The SM function selects a UPF related to a service of the session desired to be established (S7040).

Thereafter, the SM function transmits a setup request message requesting setup of resources for the session to the RAN Node 1 and receives a response message (S7050).

The SM function triggers configuration of a user plane by the UPF for the service requiring low latency, whereby the SM function may obtain information regarding QoS requirements to be applied to the session requested by the UE (S7060)>

Thereafter, the SM function transmits a session setup complete message including UL tunnel information to the RAN Node 1 and the RAN Node 1 transmits the received session setup complete message to the UE to inform the UE that the session setup has been completed (S7070).

The RAN Node 1 determines whether to establish a shared session for a specific service requiring low latency related to the UPF (S7080).

That is, the RAN Node 1 determines whether to establish a shared session according to whether the number of sessions in units of UEs set for the specific service has been previously set to establish a shared session or according to whether the number of sessions in units of UEs is greater than a threshold value based on the operator policy selected in step S7030.

That is, when the number of sessions in units of UEs is greater than the threshold value, the RAN Node 1 establishes a shared session, and when the number of sessions in units of UEs is smaller than the threshold value, the RAN Node 1 does not establish a shared session.

When the number of sessions established for the specific service requiring low latency or the number of setup request messages of the session for the specific service transmitted from multiple UEs exceeds the threshold value, the RAN Node 1 determines to establish a shared session and transmits a session setup request message requesting setup of the shared session to the SM function (S7090).

Here, the session setup request message may include an indicator indicating that a session established for mapping previously set sessions to the shared session for the specific service is a shared session, service type information indicating the specific service desired to be provided through the shared session, IDs of UEs for transmitting and receiving data of the specific service through the shared session, and the like.

Here, the IDs of the UEs may be IDs of UEs established in units of UEs for the specific service.

In cases where an amount of resource allocated to the previously established session for the specific service is smaller than an amount of resource required for establishing the shared session, that is, in cases where additional resource is required for establishing the shared session, the SM function transmits a resource setup request message requesting allocation of additional resource, and receives a response message (S7100).

That is, in the shared session, a new UE for receiving the specific service and potential UEs which are likely to use the shared session together with the UEs which are to use the shared session through handover may additionally exist in addition to the UEs which have established the session in units of UEs for the specific service.

Thus, the SM function may include minimum/maximum resource information for establishing the shared session in a resource setup request message according to characteristics of the specific service, requirements of QoS, and the like, and transmit the resource setup request message to the RAN Node 1 to thereby request allocation of additional resource.

Here, the minimum/maximum resource information included in the resource setup request message may indicate a total amount of resource for establishing the shared session or resource to be additionally allocated.

Thereafter, when establishing the shared session is completed, the SM function transmits a session setup complete message to the RAN Node 1 (S7110). Here, the RAN Node 1 knows the UL tunnel information (e.g., an address of the UPF, etc.) of the UPF with which the shared session has been established through a session setup procedure in units of UEs.

Thereafter, the RAN Node 1 transmits a shared session setup indication message indicating that the shared session has been established to the adjacent RAN Node 2 and the RAN Node 3 to inform that the shared session has been established (S7120).

Here, the session setup complete message may include an indicator indicating that the shared session for the specific service requiring low latency and service type information indicating the service requiring low latency accommodated by the shared session.

In FIGS. 6 and 7, the established shared session may be released if the number of UEs which use the established shared session is reduced to below a specific threshold value or if no UE uses the established shared session.

FIG. 8 is a flow chart illustrating an example of a method for performing handover proposed in this disclosure.

Referring to FIG. 8, in cases where a security configuration for a specific UE exists in a specific RAN Node, the specific UE may perform handover to the RAN Node with which a shared session has been established, without establishing a separate session, and update the security configuration.

Hereinafter, it is assumed that the UE has established a session in units of UEs for a specific service requiring low latency with the RAN Node 1 or has established a shared session in units of RAN nodes.

In detail, the RAN Node 2 broadcasts system information including service information indicating a service which can be provided by the RAN Node 2 (S8010).

The service information indicates whether the RAN Node 2 is able to provide network slicing for the specific service.

Or, as described above with reference to FIGS. 6 and/or 7, the RAN Node 1 recognizes information of RAN Nodes as shared session setup targets through a procedure for establishing a shared session. Thus, the RAN Node 1 may periodically transmit information of the recognized RAN Nodes, or when information of the RAN Nodes as shared session targets is changed, the RAN Node 1 may transmit the changed information of the RAN Nodes to the UE through the RRC signaling.

The UE may select RAN nodes supporting the specific service requiring low latency currently provided on the basis of the information transmitted from the RAN Nodes, measures QoS of the selected RAN nodes, and transmits information of RAN nodes whose QoS is equal to or greater than a predetermined QoS to the RAN Node 1 (S8020).

Hereinafter, it is assumed that the RAN nodes whose QoS is equal to or greater than the predetermined QoS are RAN Node 2 and RAN Node 3.

Thereafter, the UE may generate a new security key regarding the RAN Node 2 and RAN Node 3, and generate keys of an AS section using the generated security key.

The RAN Node 1 determines one of the RAN Node 2 and RAN Node 3 as a handover target RAN Node and transmits a handover request message to the determined RAN Node.

The handover request message includes service type information indicating a specific service, a UE ID indicating a UE, and security configuration information (e.g., a security key or CNI-seed key, etc.) regarding the UE.

The RAN Node 2 may recognize whether a shared session for a specific service has been established through information included in the handover request message, and in cases where a shared session has been established, the RAN Node 2 updates the corresponding shared session such that the UE may use the corresponding shared session.

That is, the RAN Node 2 transmits a message indicating updating of the shared session to allow the UE to use the shared session to CNI-1 and CPF-1 (S8040), and transmits a response message (or a handover request ACK, etc.) to the RAN Node 1 in response to the handover request message (S8050).

Thereafter, the RAN Node 1 transmits, to the UE, a handover command message instructing handover to the RAN Node 2 (S8060).

The UE performs synchronization with the RAN Node 2 and transmits and receives a handover confirm message to access the RAN Node 2 without establishing a separate session in units of UEs (S8070), whereby the UE may transmit and receive data related to the specific service to and from multiple UEs through the same shared session.

In this manner, in cases where the UE performs handover to the RAN Node with which the shared session has been established, the UE may perform handover by rapidly performing the security configuration procedure without a separate session setup procedure, and thus, delay caused due to handover to another RAN Node may be reduced.

FIG. 9 is a flow chart illustrating another example of a method for performing handover proposed in this disclosure.

Referring to FIG. 9, the RAN Node may perform handover by directly transmitting a handover request message to the C-CPF, unlike the case of FIG. 8.

Hereinafter, it is assumed that the UE has established a session in units of UEs for a specific service requiring low latency or a shared session in units of RAN nodes.

First, steps S9010 and S9020 are the same as the steps S8010 and S8020 of FIG. 8, and thus, descriptions thereof will be omitted.

Thereafter, the RAN Node 1 transmits a handover request message to the C-CPF to change a data transmission path of the UE, and the C-CPF transmits the handover request message to a CNI (e.g., a CNI-1, a CPF-1, or a UP function) related to the specific service (S9030, S9040).

The handover request message includes service type information indicating the specific service, a UE ID indicating the UE, and security configuration information (e.g., a security key, a CNI-seed key, etc.) regarding the UE, and an identifier for identifying the RAN Node 1.

Upon receiving the handover request message, the CPF-1 transmits a session update request message requesting updating of the shared session to the UPF related to the specific service to allow the UE to use the shared session for the specific service (S9050).

Upon receiving the session update request message, the UPF updates the setup of the shared session such that the UE may use the shared session, and transmits a session update response message to the C-CPF (S9060).

Upon recognizing that the setup of the shared session has been updated through the session update response message, the C-CPF transmits, to the RAN Node 2, a key configuration command message including a UE ID indicating the UE performing handover, a RAN Node ID indicating the RAN Node 1, and new security configuration information (e.g., a security configuration previously configured for the UE performing handover, a security key, and/or a CNI-seed key, etc.) (S9070).

The RAN Node 2 transmits a handover response message (or handover request ACK, etc.) to the RAN Node 1 (S9080).

Thereafter, the RAN Node 1 transmits, to the UE, a handover command message instructing handover to the RAN Node 2 (S9090).

The UE performs synchronization with the RAN Node 2 and transmits and receives a handover confirm message to access the RAN Node 2 without establishing a separate session in units of UEs (S9100), whereby the UE may transmit and receive data related to the specific service to and from multiple UEs through the same shared session.

FIG. 10 is a block diagram of a wireless communication device to which the methods proposed in this disclosure may be applied.

Here, the wireless device may be an eNB or a UE, and the eNB includes all of a macro eNB, a RAN Node, and a small eNB.

As illustrated in FIG. 10, the eNB 1010 and the UE 1020 include communication units (transceiver units or RF units 1013 and 1023), processors 1011 and 1021, and memories 1012 and 1022, respectively.

In addition, the eNB and the UE may further include an input unit and an output unit.

The communication units 1013 and 1023, the processors 1011 and 1021, the input unit, the output unit, the memories 1012 and 1022 are functionally connected to perform a method proposed in this disclosure.

When information created from a physical layer (PHY) protocol is received, the communication units (transceiver units or RF units 1013 and 1023) move the received information to a radio-frequency (RF) spectrum, perform filtering, amplification, and the like, and transmit corresponding information to an antenna. Also, the communication units 1013 and 1023 serve to move an RF signal received by the antenna to a band in which the RF signal can be processed in the PHY protocol, and perform filtering thereon.

Also, the communication units 1013 and 1023 may have a switch function for switching transmission and reception functions.

The processors 1011 and 1021 implement functions, processes and/or methods proposed in this disclosure. Layers of a radio interface protocol may be implemented by the processors 1011 and 1021.

The processors 1011 and 1021 may also be expressed by a controller, a control unit, a computer, and the like.

The memories 1012 and 1022 are connected to the processors 1011 and 1021 to store a protocol or a parameter for performing an uplink resource allocation method, respectively.

The processors 1011 and 1021 may include an application-specific integrated circuit (ASIC), another chip set, a logic circuit and/or data processing device. The memories 1012 and 1022 may include a read-only memory (ROM), a random access memory (RAM), a flash memory, a memory card, a storage medium and/or any other storage device. The communication units 1013 and 1023 may include a baseband circuit for processing a wireless signal. When an embodiment is implemented by software, the aforementioned techniques may be implemented by a module (process, function, etc.) performing the aforementioned functions.

The module may be stored in the memory 1012 or 1022 and executed by the processor 1011 or 1021. The memory 1012 or 1022 may be present within or outside the processor 1011 or 1021 mad may be connected to the processor 1011 or 1021 through a well-known unit.

The output unit (display unit) is controlled by the processor 1011 or 1021, and outputs information output from the processor 1011 or 1021, together with a key input signal generated by a key input unit and various type information signals from the processor 1011 or 1021.

According to an embodiment of the present disclosure, since a session for transmitting and receiving data for a service requiring low latency in a next-generation system is established, requirements of the low latency service may be satisfied.

Also, according to an embodiment of the present disclosure, since a session for a serving requiring low latency is established in units of BSs, multiple UEs may transmit and receive data to and from a BS through a single session.

Also, according to an embodiment of the present disclosure, since a UE transmits and receives data through a previously established session, without having to establish a separate session, latency for providing a service is reduced.

Also, according to an embodiment of the present disclosure, since handover is performed without establishing a separate session, latency due to handover may be reduced.

The effect of the present disclosure is not limited to the above-described effects and the other effects will be understood by those skilled in the art from the following description.

Although respective drawings are divisionally described for convenience of description, the embodiments described in the respective drawings may be designed so as to be combined to implement a new embodiment. When necessary, design of a recording medium readable by a computer in which a program to execute the above-described embodiments is recorded may fall within the scope of the appended claims and their equivalents.

As for the method and apparatus for authenticating a terminal between heterogeneous networks in a wireless communication system according to the present disclosure, the configuration and method according to the embodiments of the present disclosure described above are not limited in its application, but the entirety or a portion of the embodiments may be selectively combined to be configured into various modifications.

In the embodiments of the present disclosure, the method for transmitting and receiving data according to the present disclosure may be implemented as codes that can be read by a processor provided in a network device in a recording medium. The processor-readable recording medium may include any type of recording devices in which data that can be read by the processor is stored. The processor-readable recording medium may include a ROM, a RAM, a CD-ROM, a magnetic tape, a floppy disk, an optical data storage device, and the like. The processor-readable medium also includes implementations in the form of carrier waves or signals, e.g., transmission via the Internet. The processor-readable recording medium may be distributed over network-coupled computer systems so that the processor-readable code may be stored and executed in a distributed fashion.

Specific exemplary embodiments have been described. However, the present disclosure is not limited to the specific exemplary embodiments and various modifications may be made without departing from the scope of the present disclosure claimed in the claims, and such modifications should not be individually understood from technical concepts or prospects of the present disclosure.

Further, although the disclosure has described both product inventions and process inventions, description of both inventions may be complementarily applied as needed.

In the wireless communication system of this disclosure, an example of the method and apparatus for establishing a session for data transmission and reception in a wireless communication system applied to a 3GPP LTE/LTE-A system has been described, but the method and apparatus for establishing a session for data transmission and reception in a wireless communication system may also be applied to various other wireless communication systems, as well as to the 3GPP LTE/LTE-A system.

What claim is:

1. A method for establishing a shared session for a first radio access network (RAN) node to transmit and receive data in a wireless communication system, the method comprising:
   receiving a session setup request message requesting a session setup from a terminal,
   wherein the session setup request message includes at least one of a service type indicator indicating a type of a specific service requesting the session setup or first information related to adjacent RAN nodes supporting the specific service,
   wherein the terminal periodically transmits the first information to the first RAN node repeatedly, depending on a type of the first information, and
   wherein the service type indicator is transmitted through RRC signaling when the service type indicator is not included in the session setup request message;
   transmitting the session setup request message to a first network node for the session setup;
   receiving a shared session setup complete message from the first network node; and
   transmitting the shared session setup complete message to the terminal,
   wherein the shared session setup complete message includes a setup indicator indicating setup of a specific shared session and second information related to at least one RAN node to which the specific shared session is established among the adjacent RAN nodes, and
   wherein the specific shared session is established as a single session between at least one RAN nodes and multiple terminals and is a wireless path on which multiple terminals transmit and receive data related to the specific service to and from the same RAN node, and
   wherein the specific shared session is released when the number of terminals using the specific shared session is below a certain threshold value.

2. The method of claim 1,
   wherein the at least one RAN node is a RAN node selected by the multiple terminals from among multiple RAN nodes, as a shared session setup target RAN node of the specific service.

3. The method of claim 1, further comprising:
   receiving a resource setup request message requesting setup of resource for the specific shared session from the first network node; and
   transmitting a response message in response to the resource setup request message to the first network node.

4. The method of claim 1,
   wherein the shared session setup complete message further includes tunnel information related to the specific shared session.

5. The method of claim 1, further comprising:
   receiving a measurement report message indicating a quality of signal (QoS) of the at least one RAN node measured by the terminal from the terminal;

transmitting a handover request message requesting handover of the terminal to a target RAN node among the at least one RAN node;
receiving a handover response message from the target RAN node in response to the handover request message; and
transmitting, to the terminal, a handover command message instructing handover to the target RAN node,
wherein the handover request message includes service type information indicating the specific service.

6. The method of claim 1, further comprising:
receiving a measurement report message indicating a quality of signal (QoS) of the at least one RAN node measured by the terminal from the terminal;
transmitting, to a second network node, a handover request message requesting handover to a target RAN node among the at least one RAN node;
receiving a handover response message from the target RAN node in response to the handover request message; and
transmitting, to the terminal, a handover command message instructing handover to the target RAN node,
wherein the handover request message includes service type information indicating the specific service.

7. A method for establishing a shared session for a terminal to transmit and receive data in a wireless communication system, the method comprising:
transmitting a session setup request message requesting a session setup to a radio access network (RAN) node,
wherein the session setup request message includes at least one of a service type indicator indicating a type of a specific service requesting the session setup or first information related to adjacent RAN nodes supporting the specific service,
wherein the first RAN node periodically receives the first information by the terminal repeatedly, depending on a type of the first information, and
wherein the service type indicator is transmitted through RRC signaling when the service type indicator is not included in the session setup request message; and
receiving a shared session setup complete message from the RAN node,
wherein the shared session setup complete message includes a setup indicator indicating setup of a specific shared session and second information related to at least one RAN node to which the specific shared session is established, among the adjacent RAN nodes,
wherein the specific shared session is established as a single session between at least one RAN nodes and multiple terminals and is a wireless path on which multiple terminals transmit and receive data related to the specific service to and from the same RAN node, and
wherein the specific shared session is released when the number of terminals using the specific shared session is below a certain threshold value.

8. The method of claim 7, wherein the at least one RAN node is a RAN node selected by the multiple terminals from among multiple RAN nodes, as a shared session setup target RAN node of the specific service.

9. A first radio access network (RAN) node for establishing a shared session to transmit and receive data in a wireless communication system, the first RAN node comprising:
a communication unit transmitting and receiving a radio signal to and from an external source; and
a processor functionally coupled to the communication unit,
wherein the processor is configured to:
receive a session setup request message requesting a session setup from a terminal,
wherein the first session setup request message includes at least one of a service type indicator indicating a type of a specific service requesting the session setup or first information related to adjacent RAN nodes supporting the specific service,
wherein the terminal periodically transmits the first information to the first RAN node repeatedly, depending on a type of the first information, and
wherein the service type indicator is transmitted through RRC signaling when the service type indicator is not included in the session setup request message,
transmit the session setup request message to a first network node for the session setup,
receive a shared session setup complete message from the first network node, and
transmit the shared session setup complete message to the terminal,
wherein the shared session setup complete message includes a setup indicator indicating setup of a specific shared session and second information related to at least one RAN node to which the specific shared session is established, among the adjacent RAN nodes,
wherein the specific shared session is established as a single session between at least one RAN nodes and multiple terminals and is a wireless path on which multiple terminals transmit and receive data related to the specific service to and from the same RAN node, and
wherein the specific shared session is released when the number of terminals using the specific shared session is below a certain threshold value.

10. The first RAN node of claim 9,
wherein the at least one RAN node is a RAN node selected by the multiple terminals from among multiple RAN nodes, as a shared session setup target RAN node of the specific service.

11. The first RAN node of claim 9, wherein the processor is further configured to:
receive a resource setup request message requesting setup of resource for the specific shared session from the first network node and
transmit a response message in response to the resource setup request message to the first network node.

12. The first RAN node of claim 9,
wherein the shared session setup complete message further includes tunnel information related to the specific shared session.

13. The first RAN node of claim 9, wherein the processor is further configured to:
receive a measurement report message indicating a quality of signal (QoS) of the at least one RAN node measured by the terminal from the terminal;
transmit a handover request message requesting handover of the terminal to a target RAN node among the at least one RAN node;
receive a handover response message from the target RAN node in response to the handover request message, and
transmit, to the terminal, a handover command message instructing handover to the target RAN node,
wherein the handover request message includes service type information indicating the specific service.

14. The first RAN node of claim 9, wherein the processor is further configured to:

receive a measurement report message indicating a quality of signal (QoS) of the at least one RAN node measured by the terminal from the terminal,
transmit, to a second network node, a handover request message requesting handover to a target RAN node among the at least one RAN node,
receive a handover response message from the target RAN node in response to the handover request message, and
transmit, to the UE, a handover command message instructing handover to the target RAN node,
wherein the handover request message includes service type information indicating the specific service.

* * * * *